July 21, 1953 L. S. WILLIAMS 2,646,236
HYDRAULIC SCALE PLATFORM SUPPORTING MEANS
Filed Feb. 27, 1947 2 Sheets-Sheet 1
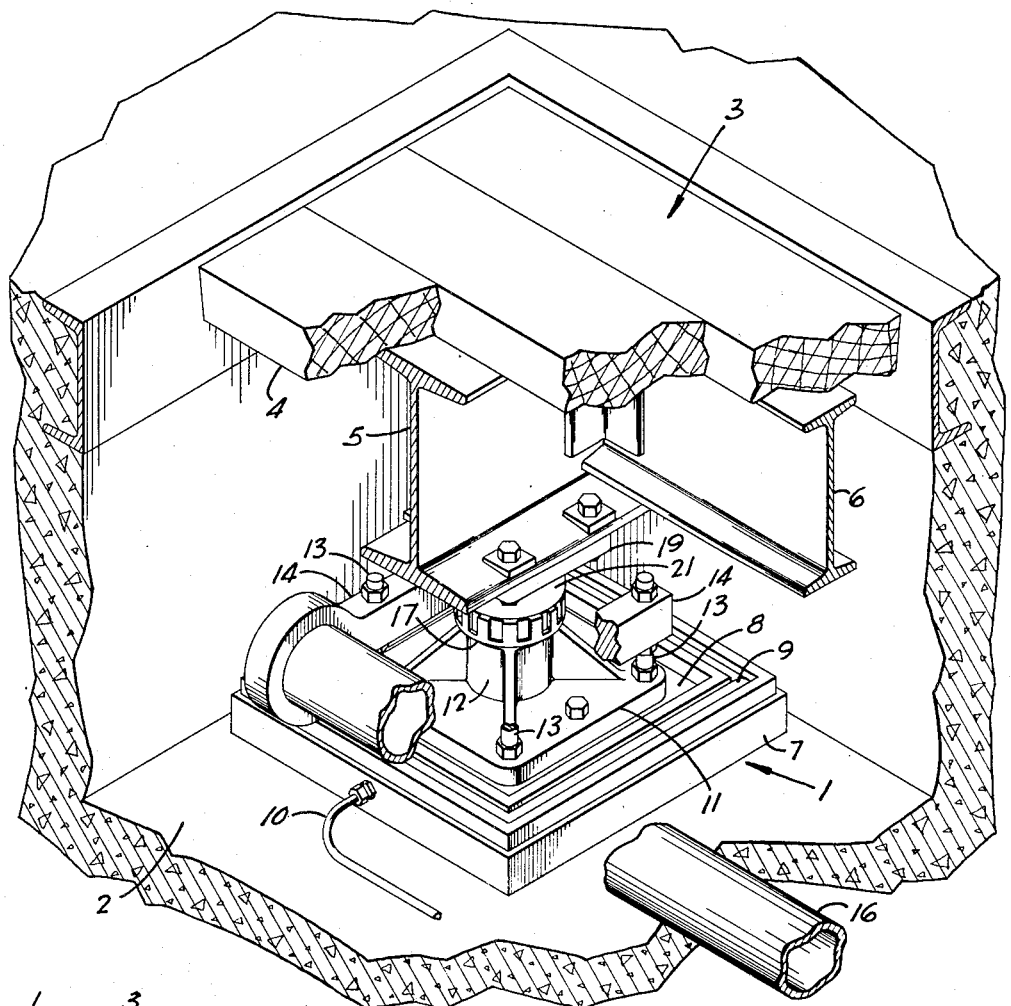
Fig. I
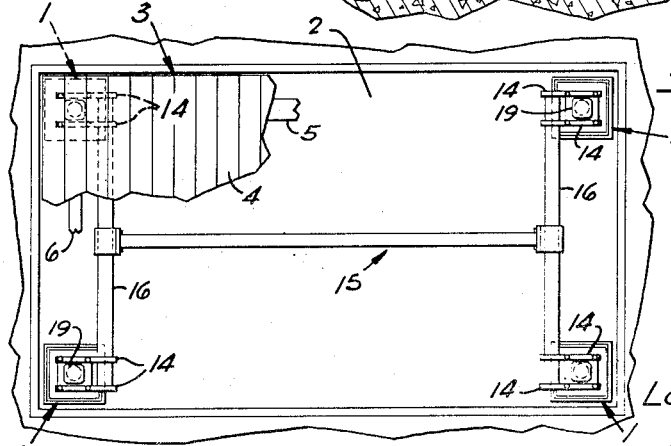
Fig. II
INVENTOR.
Lawrence S. Williams
BY
Marshall and Marshall
ATTORNEYS July 21, 1953   L. S. WILLIAMS   2,646,236
HYDRAULIC SCALE PLATFORM SUPPORTING MEANS
Filed Feb. 27, 1947   2 Sheets-Sheet 2
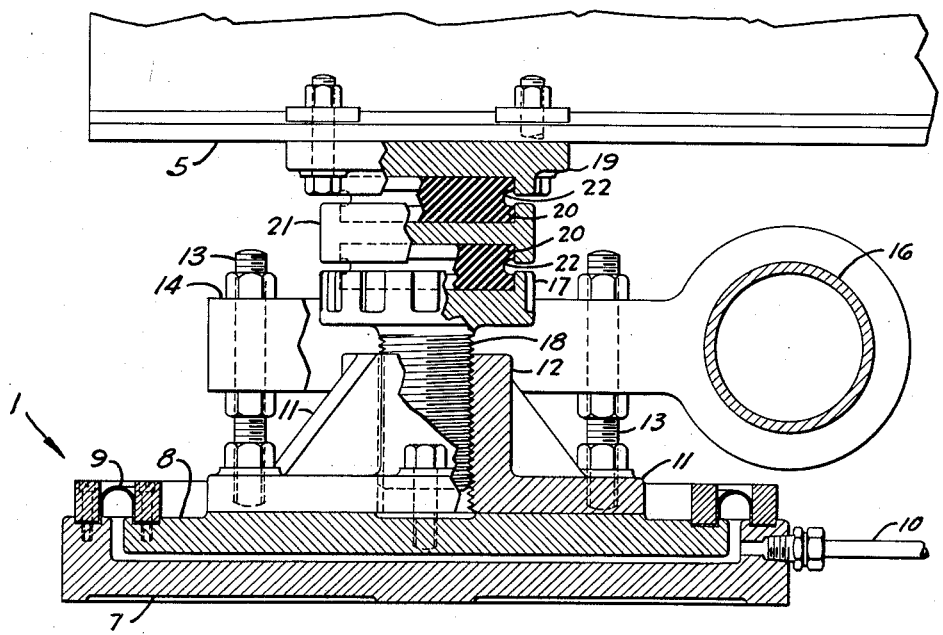
Fig. III
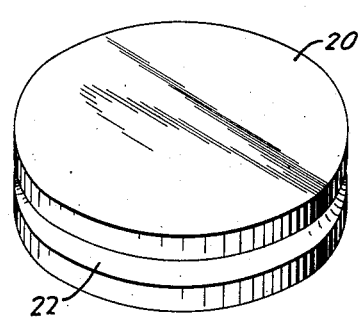
Fig. IV
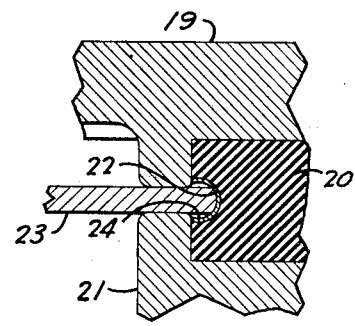
Fig. V
INVENTOR.
Lawrence S. Williams
BY
Marshall and Marshall
ATTORNEYS Patented July 21, 1953

2,646,236

UNITED STATES PATENT OFFICE 2,646,236

HYDRAULIC SCALE PLATFORM
SUPPORTING MEANS

Lawrence S. Williams, Toledo, Ohio, assignor to Toledo Scale Company, Toledo, Ohio, a corporation of New Jersey Application February 27, 1947, Serial No. 731,283

5 Claims. (Cl. 248—2)

This invention relates to hydraulic scales and in particular to means for supporting the platform of a hydraulic scale from the hydraulic capsules.

The load receivers of heavy duty weighing scales that are commonly used for weighing vehicles must be supported in a manner such that they may move horizontally without imposing excessive strain on the load supporting elements. It has been customary to employ suspension links or balls resting in concave pockets to permit a limited amount of horizontal movement of the load receiver without dislodging the bearings from the lever knife edges. These arrangements are not entirely satisfactory when applied to a hydraulic weighing system either because of their excessive cost or because of the eccentric loading applied to the hydraulic capsules. Furthermore, to achieve high accuracy, it is necessary that the parts of the hydraulic capsules be prevented from tipping or other deflections which cause a change in effective area.

The principal object of this invention is to provide a supporting assembly to be interposed between a hydraulic capsule and a load receiver, which assembly accommodates limited horizontal movement of the load receiver and which does not transmit substantial bending or tilting forces to the capsules.

Another object of the invention is to provide a supporting system that is easily adjustable for height.

A still further object of the invention is to provide an economical structure that may be easily assembled or disassembled and which will transmit load forces from a load receiver to a capsule without transmitting substantial horizontal forces or bending moments.

These and other objects and advantages are apparent from the following description in which reference is made to the accompanying drawings.

In the drawings:

Figure I is a perspective view with parts broken away showing the improved supporting system mounted on a hydraulic capsule and supporting one corner of a load receiver.

Figure II is a plan view, with parts broken away to show the stabilizing frame for interconnecting the capsules.

Figure III is an elevation, partly in section, of the improved load receiver supporting system.

Figure IV is a perspective view of one of the rubber members employed in the supporting assembly.

Figure V is a vertical section to illustrate a method of manufacture of the improved supporting system.

These specific figures and the accompanying description are intended merely to illustrate the invention but not to impose limitations on the claims.

The invention consists in the employment of a pair of shaped rubber members stressed in compression and mounted in adjustable guided holders which with the rubber members form a column between a hydraulic capsule and a load receiver.

In the drawings a preferred form of the invention is shown embodied in a hydraulic weighing scale. Referring to Figure I, a hydraulic capsule 1 is mounted on the floor 2 of a pit that receives the hydraulic capsules and a weighbridge 3 supported from the capsules. The weighbridge 3, serving as a load receiver, consists of planking 4 that is laid on I-beam girders 5 that are held in spaced relation by transverse I-beams 6.

The capsule 1 includes a recessed base member 7, a diaphragm 8 that fits in the recess of the base member 7 and a membrane 9 that is made of thin sheet metal and that seals the space between the sides of the recess in the base member 7 and the edges of the diaphragm 8. Hydraulic fluid is confined beneath the diaphragm 8 and under the membrane 9 and this hydraulic fluid serves to support the diaphragm 8 against the load forces applied to the weighbridge 3. The pressure developed in the hydraulic fluid is proportional to the supported load and is transmitted through a tube 10 to pressure receiving and indicating mechanism.

A standard 11 having a vertical cylindrical center portion 12 is centrally located on and secured to the diaphragm 8. Bolts 13 studded into the corners of the standard 11 extend vertically through horizontally directed arms 14 of an H-shaped stabilizing framework 15 that interconnects the diaphragms 8 and standards 11 of the plurality of capsules that, together, support the weighbridge 3. The arms 14 are rigidly secured to and extend horizontally from a pipe 16 that serves as a cross member of the stabilizing framework 15. The stabilizing framework 15 serves to minimize any tipping of the diaphragms 8 because of deflections or movement of the weighbridge 3.

In order that the stabilizing framework 15 be effective in preventing tipping of the capsule diaphragms it is necessary that force be transmitted from the weighbridge 3 to the diaphragm 8 as a compression force without any appreciable bending moment component. For transmitting the compression force a short column that is flexible in bending is inserted between the standard 11 and the undersurface of the weighbridge girder 5. This column comprises a lower cup-shaped member 17 surmounting a threaded stem 18 that is screwed into the cylindrical portion 12 of the standard 11, a recessed plate 19 secured to the weighbridge girder 5, a pair of rubber inserts 20 and a spacer 21 that is recessed on its upper and lower surfaces. The rubber inserts 20 are engaged in the cup-shaped recesses one between the lower cup-shaped member 17 and the spacer 21 and the other between the spacer 21 and the recessed plate 19 secured to the weighbridge girder 5. The rubber inserts 20 are sufficiently thick so that the metallic parts are separated under all conditions of loading.

The upper cup-shaped plate 19 is square and is bolted to the weigh beam girder 5 by means of four bolts so that the height of the column may be adjusted to within a quarter of the pitch of the threads on the stem 18.

The rubber inserts 20 are each provided with an annular groove 22 that lies opposite the gap between the cup-shaped members that partially enclose the insert. The annular groove is of particular importance because, in the first place, it decreases the cross sectional area of the rubber to a certain extent thereby promoting greater flexibility for accommodating horizontal movement of the weighbridge 3. A second and more valuable result is that the annular groove 22 materially reduces the localized stress in the rubber when load is applied to the load receiver. In previous attempts to utilize a similar structure, i. e., a rubber column encircled by metallic bands, no relief or groove was provided and the localized stresses in the rubber at the gaps between the bands materially decreased the allowable load carrying capacity of the rubber. By providing the annular groove the localized stresses are materially reduced so that the load carrying capacity for a given area of rubber is increased from 3 to 5 times that of a similar construction without the annular groove.

The rubber inserts 20 may be molded to be a close fit within the cup-shaped recesses and may be inserted loose in the assembly or they may be molded and vulcanized in place so as to make a complete bonded assembly. The latter construction is preferred and Figure V illustrates one method of molding the rubber and simultaneously bonding it to the adjacent cup-shaped members. In Figure V the spacer 21 and the upper cup-shaped plate 19 are shown separated by one of a pair of die members 23 that together form an apertured plate. An annular spun aluminum ring 24 that is substantially C-shaped in cross section is held in place within the cavity and covering the inner edge—the periphery of the aperture—of the die member 23. The rubber molding compound is filled into the cavity before the upper plate 19 is put in place. After the rubber is cured the die members 23 are removed and the aluminum ring is dissolved by immersing the structure in a caustic soda solution. The cup-shaped members are each cadmium plated to resist the caustic soda solution.

This column structure for supporting a weighbridge from a hydraulic capsule affords a structure that is comparatively stiff in compression and yet flexible enough to accommodate substantial horizontal movement of the weighbridge. The horizontal movement is allowed because the spacer ring 21 is allowed to tip so that the rubber absorbs the horizontal motion by bending in the two sections rather than in shear across one of the inserts. The relief afforded by the groove 22 raises the allowable load carrying capacity by a factor of at least 3 and probably 5 and the threaded stem permits easy, accurate height adjustment for distributing the weight of the load receiver between the several capsules serving as supports.

Various modifications may be made in adapting the improved supporting assembly to adapt it for use in various weighing scales without departing from the spirit and scope of the invention.

Having described the invention, I claim:

1. In a hydraulic weighing scale, a short resilient column interposed between a load receiver and a supporting hydraulic capsule comprising a pair of cup-shaped members attached one to the load receiver and the other to the capsule, a spacer having recesses facing the recesses of the cup-shaped members, and rubber inserts in the recesses for holding the members separated from the spacer and for transmitting force from one member to the spacer and from the spacer to the other member, said rubber inserts each having a groove therein that is adjacent to and that extends inwardly from the space between the rims of the recesses of the spacer and the adjacent member.

2. In a hydraulic weighing scale, a short resilient column between a load receiver and a hydraulic capsule serving as a support for the load receiver, the resilient column comprising a pair of recessed members attached one to the load receiver and the other to the capsule, at least one intermediate member having recessed faces interposed between the recessed members, and a rubber insert in each pair of opposed recesses for holding the members in spaced relation and transmitting load force through the column, said rubber insert having a groove that is adjacent to and that extends inwardly from the space between the rims of the members.

3. In a hydraulic weighing scale, a short resilient column between a load receiver and a hydraulic capsule serving as a support for the load receiver, the resilient column comprising a pair of recessed members attached one to the load receiver and the other to the capsule, at least one intermediate member having recessed faces interposed between the members, and a rubber insert in each pair of opposed recesses for holding the members in spaced relation and transmitting load force through the column, said rubber insert having adjacent the space between the rims of the members a groove that is substantially semicircular in cross section.

4. In a hydraulic weighing scale, a short resilient column between a load receiver and a supporting hydraulic capsule comprising, a first member connected to the capsule, a second member connected to the load receiver, at least one of the members having a threaded portion for height adjustment, both of said members having recesses, a spacer interposed between said members and having a recess facing each, and a rubber insert bonded in each pair of juxtaposed recesses for transmitting load force through the column, each of said inserts having an annular groove encircling the insert and at least equal in height to the space between the rims of the recesses.

5. In a hydraulic weighing scale, a short resilient column between a load receiver and a supporting hydraulic capsule comprising, a first member connected to the capsule, a second member connected to the load receiver, at least one of the members having a threaded portion for height adjustment, both of said members having recesses, a spacer member interposed between said members and having a recess facing each, and a rubber insert located in each pair of juxtaposed recesses for transmitting load force through the column, each of said inserts having an annular groove encircling the insert and at least equal in height to the space between the rims of the recesses.

LAWRENCE S. WILLIAMS.

References Cited in the file of this patent

UNITED STATES PATENTS

| Number | Name | Date |
|---|---|---|
| 98,540 | Alden | Jan. 4, 1870 |
| 1,418,655 | Klemmer | June 6, 1922 |
| 1,829,676 | Royce | Oct. 27, 1931 |
| 1,975,909 | Trott | Oct. 9, 1934 |
| 2,005,934 | Carter | June 25, 1935 |
| 2,091,679 | Grant | Aug. 31, 1937 |
| 2,273,869 | Julien | Feb. 24, 1942 |
| 2,279,912 | Bohannan | Apr. 14, 1942 |
| 2,323,216 | Goldschmidt | June 29, 1943 |
| 2,403,204 | Feld | July 2, 1946 |
| 2,447,712 | Nathan | Aug. 24, 1948 |
| 2,457,058 | Markowitz | Dec. 21, 1948 |

FOREIGN PATENTS

| Number | Country | Date |
|---|---|---|
| 154,034 | Germany | Aug. 10, 1938 |
| 672,736 | France | June 6, 1930 |
| 847,039 | France | Oct. 2, 1939 |